United States Patent
Zriny et al.

(10) Patent No.: US 8,867,340 B2
(45) Date of Patent: Oct. 21, 2014

(54) DISCARDED PACKET INDICATOR

(75) Inventors: Donald P. Zriny, Lucas, TX (US); Frederick Skoog, Colleyville, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 1148 days.

(21) Appl. No.: 11/314,455

(22) Filed: Dec. 21, 2005

(65) Prior Publication Data

US 2007/0140151 A1     Jun. 21, 2007

(51) Int. Cl.
| | | |
|---|---|---|
| *H04J 1/16* | (2006.01) | |
| *H04L 1/00* | (2006.01) | |
| *H04L 29/06* | (2006.01) | |
| *H04L 12/823* | (2013.01) | |
| *H04L 12/833* | (2013.01) | |
| *H04L 1/20* | (2006.01) | |
| *H04L 12/835* | (2013.01) | |
| *H04L 12/801* | (2013.01) | |
| *H04L 1/08* | (2006.01) | |

(52) U.S. Cl.
CPC ............. *H04L 47/10* (2013.01); *H04L 1/0066* (2013.01); *H04L 1/005* (2013.01); *H04L 65/80* (2013.01); *H04L 47/326* (2013.01); *H04L 47/31* (2013.01); *H04L 65/4076* (2013.01); *H04L 1/20* (2013.01); *H04L 47/30* (2013.01); *H04L 47/33* (2013.01); *H04L 29/06027* (2013.01); *H04L 1/08* (2013.01)
USPC .......................................... 370/229; 370/474

(58) Field of Classification Search
USPC ......... 370/229, 230–235, 401, 412, 389–392, 370/474
See application file for complete search history.

(56) References Cited

U.S. PATENT DOCUMENTS

| | | | | |
|---|---|---|---|---|
| 6,498,865 B1 * | 12/2002 | Brailean et al. | ............... | 382/239 |
| 6,665,297 B1 * | 12/2003 | Hariguchi et al. | ............ | 370/392 |
| 6,700,871 B1 * | 3/2004 | Harper et al. | ................ | 370/235 |
| 6,731,613 B1 * | 5/2004 | Provance | ...................... | 370/311 |
| 7,009,937 B2 * | 3/2006 | Miyamoto | .................... | 370/229 |
| 7,505,469 B2 * | 3/2009 | Oh | .......................... | 370/395.52 |
| 8,284,845 B1 * | 10/2012 | Kovacevic et al. | ........ | 375/240.26 |
| 2002/0181471 A1 * | 12/2002 | Panico | ..................... | 370/395.42 |
| 2003/0210703 A1 * | 11/2003 | Lee | ............................... | 370/412 |
| 2004/0146153 A1 * | 7/2004 | Solin | ........................ | 379/210.02 |
| 2004/0165572 A1 * | 8/2004 | Park | .............................. | 370/349 |
| 2004/0252691 A1 * | 12/2004 | Hori et al. | ..................... | 370/390 |
| 2005/0229074 A1 * | 10/2005 | Chawla et al. | ................ | 714/758 |
| 2006/0098672 A1 * | 5/2006 | Schzukin et al. | ............. | 370/412 |
| 2007/0058646 A1 * | 3/2007 | Hermoni | ....................... | 370/401 |

FOREIGN PATENT DOCUMENTS

WO     0056606 A1    9/2000

OTHER PUBLICATIONS

Mehaoua, A., et al.; FEC-PSD: A FEC-Aware Video Packet Drop Scheme; GLOBECOM '99; IEEE Global Telecommunications Conference; 1999; pp. 2091-2096; vol. 4.

* cited by examiner

*Primary Examiner* — Kan Yuen
(74) *Attorney, Agent, or Firm* — Capitol Patent & Trademark Law Firm, PLLC

(57) ABSTRACT

A source device (10) sends information to a destination device (12) through intermediary network elements (14). If an intermediary network element (14) needs to discard one or more packets of information, it sends a smaller informational packet to the destination device (12). Upon receiving the informational packet, the destination device can immediately begin correctional procedures.

16 Claims, 3 Drawing Sheets

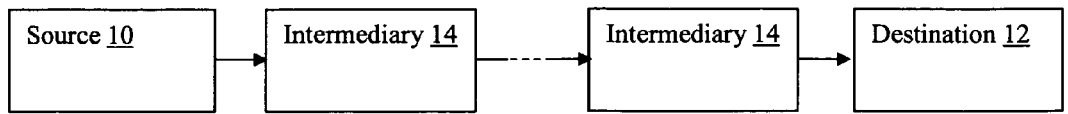
Fig. 1 (Prior Art)
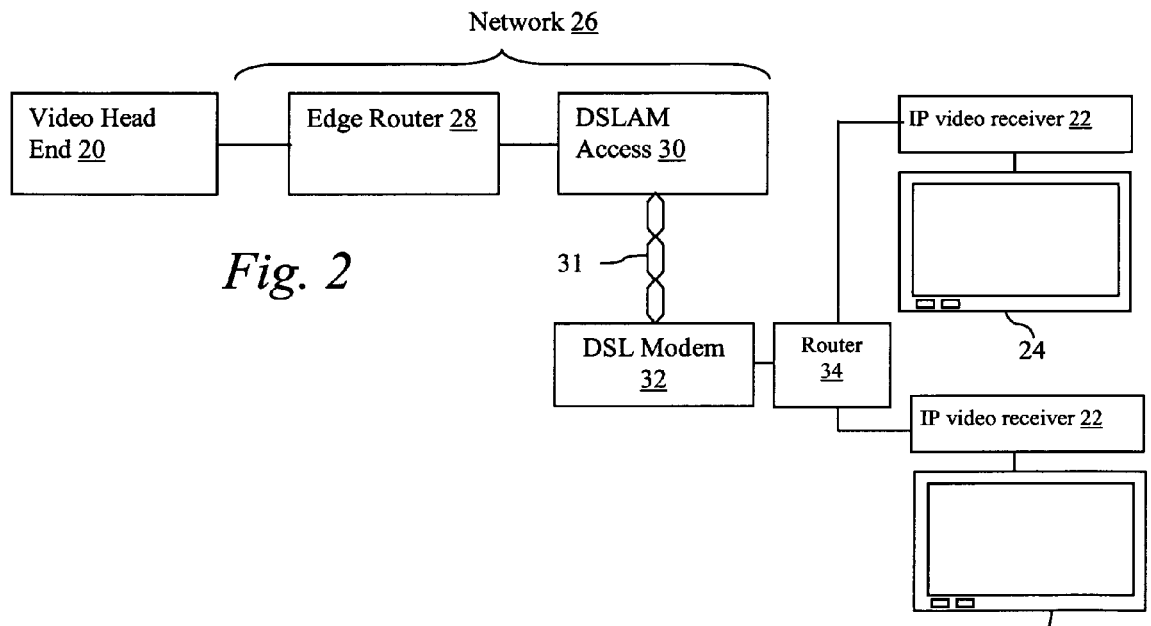
Fig. 2
Fig. 3 (Prior Art)
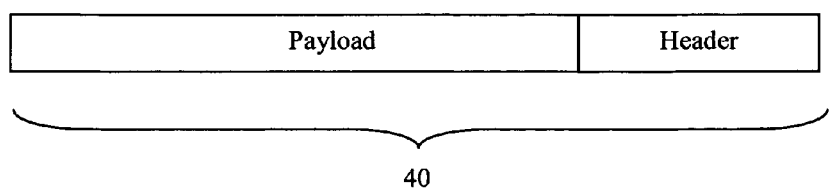

DISCARDED PACKET INDICATOR

STATEMENT OF FEDERALLY SPONSORED RESEARCH OR DEVELOPMENT

The U.S. Government has a paid-up license in this invention and the right in limited circumstances to require the patent owner to license others on reasonable terms as provided for by the terms of. Award No. 70NANB3H3053 awarded by National Institute of Standards and Technology.

BACKGROUND OF THE INVENTION

1. Technical Field

This invention relates in general to digital information delivery networks and, more particularly, to a method and apparatus for indicating discarded packets in a network.

2. Description of the Related Art

In a digital information delivery network, between a source device and a destination device, packets of data may be lost for a variety of reasons. Some packets are randomly lost due to uncontrollable errors—for example, errors caused by noise on a transmission line, synchronization issues, etc. Some packets are lost due to constraints in network resources (e.g. transmission, switching, computing, etc). In this case packets are normally deleted in a controlled manner.

Using current technologies, the destination device of a stream of packets currently cannot distinguish between missing packets due to controlled circumstances and missing packets due to uncontrolled circumstances. For some data transfer protocols, missing packets cause the destination device to request a retransmission of the missing information. This is not very feasible in a network that has multicasting of real-time streams such as audio or video. Normally, there will not be enough time available for requesting and receiving the retransmitted packets, unless buffers at the destination device are very large. If the problem of packet loss is due to congestion, retransmission requests can only add to the congestion.

When an expected packet in a packet stream is not received at the destination device, the destination device waits for a certain amount of time before declaring a packet as lost. Once a packet is declared as lost, the destination device attempts to recover either by retransmission or by error concealment techniques. By the time a loss of data is determined it may be too late to process error recovery or error concealment algorithms for real-time services.

Several solutions are known for detecting packet loss at the destination device but they all require a time delay that may be detrimental for real-time services. Some protocols provide for a sequence number in each packet in a stream. If, at the destination device, a numbered packet does not arrive in sequence, a lost packet condition is declared and error recovery mechanisms can start. Another method waits for a timeout period and then declares a loss of packet. Yet another method ignores the lost data and processes the next data packet that arrives at the destination device.

The delay incurred in currently available packet loss detection techniques can be detrimental to real-time services. The destination device waiting to declare the packet lost wastes time and processor resources that would be better used to conceal the error caused by the lost information. If the packet loss is ignored for audio or video services objectionable artifacts will be experienced by the application listener or viewer.

Accordingly, there is a need for a method and apparatus for identifying and remediating lost packets.

BRIEF SUMMARY OF THE INVENTION

In the present invention, a network includes a source device for sending information and a destination device for receiving the information from the source device. Intermediate network elements pass information between the source device and destination device. The intermediate network elements identify packets of information for discard and, in response to identifying one or more packets for discard, send a notification to the destination device indicating a decision to discard the one or more packets.

The present invention provides significant advantages over the prior art. The intermediate network element realizes significant bandwidth savings by sending a small notification packet indicating that the payload was removed. The destination device may initiate error correction tasks as soon as the small notification packet is received. In a video application, the increase in the quality of the video will be apparent when early error concealment is used instead of displaying an obvious glitch (objectionable video artifact) caused by a missing packet. Furthermore, the destination device can inhibit retransmission requests, if applicable, to avoid adding to an existing congestion problem.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 1 illustrates a block diagram of a an example of a data path between a source device and a destination device through intermediary network elements in a data network;

FIG. 2 shows a more detailed view of a specific type of IP video network;

FIG. 3 illustrates a greatly simplified view of a packet of the type that would be used to convey video or audio data;

DETAILED DESCRIPTION OF THE INVENTION

Figure 4A:
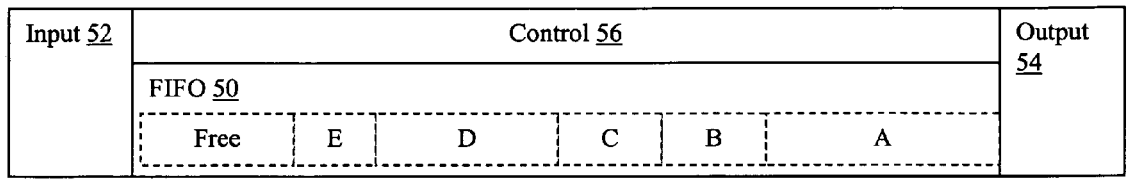
FIG. 4a illustrates a simplified block diagram of an intermediary network element.

The present invention is best understood in relation to FIGS. 1-7 of the drawings, like numerals being used for like elements of the various drawings.

FIG. 1 illustrates an example of a path between a source device 10 and a destination device 12 in a data network. The source device 10 could be, for example, a video server or an audio server, and the destination device could be a user computing device (such as a desktop/mobile computer, handheld computer/PDA, or smart phone with network access), an internal or external ("set-top") IP video receiver, or an internal or external IP audio receiver. Between source device 10 and destination device 12, there are one or more intermediate network elements 14 which pass information between the source device 10 and destination device 12. The intermediate network elements 14 could be, for example, Internet and/or proprietary network routers and multiplexers.

In operation, the source device 10 streams data to the destination 12 (in a real embodiment, the source device 10 is likely to stream data to multiple destinations 12, either as a unicast or as a multicast transmission). The destination 12 and the intermediary network devices buffer data, typically in FIFO (first-in, first-out) memories. Between the source device 10 and the destination 12, data may be delayed or lost. For example, one of the intermediary network elements 14 may have a FIFO overrun, wherein data is being received at a faster pace than it can be transmitted to the next intermediary network element 14 or the destination device 12. In this case, some of the data packets intended for the destination device 12 may be dropped by the intermediary network element 14 and, hence, never arrive at the destination device 12. Similarly, an intermediary network element 14 may anticipate a situation where an overrun is likely to occur and cancel packets in the FIFO. Again, the cancelled packets will not arrive at the destination device 12.

The destination device 12 will also have a buffer, such that slight delays in the arrival of packets will not affect the output sound or video. Generally speaking, the longer the buffer, the longer delay the destination device 12 can incur without taking remedial measures. At some point, however, the destination device 12 will no longer be able to wait for an expected packet and will take measures to continue the audio or video without the packet. If the packet arrives after this point, it will simply be dropped by the destination device 12. In some instances, the destination device 12 may be able to request the source device 10 to re-send the missing data; generally, however, a glitch will occur at the destination device 12 due to the missing information.

FIG. 2 shows a more detailed view of a specific type of IP video network that may take advantage of the present invention, although the invention is not limited to this type of network. In FIG. 2, a VHE (video head end) 20 streams video packets to one or more IP video receivers 22. The IP video receivers 22 translate the video packets to video for video monitors 24. To get to the IP video receivers 22, the data must pass through a public/private network 26 which may include a plurality of routers, including edge router 28. The output of edge router 28 is received by DSLAM (digital subscriber line access multiplexer) element 30, where the data is placed on twisted pair lines 31. A DSL modem 32 on the user premises communicates between the DSLAM element 30 and the IP video receivers 22 through premises router 34.

It should be noted that the specific embodiment shown in FIG. 2 is directed to IP video services over a DSL connection at the user premises. Other configurations for communication to the premises could also be used with the present invention, including digital cable, wireless communications, and optical fiber.

In operation, the video head end streams video information to the IP video receivers 22. For live video broadcasts, such as a live television signal, the video data is typically sent as a multicast transmission. For on-demand video, unicast transmission may be used.

Figure 6:
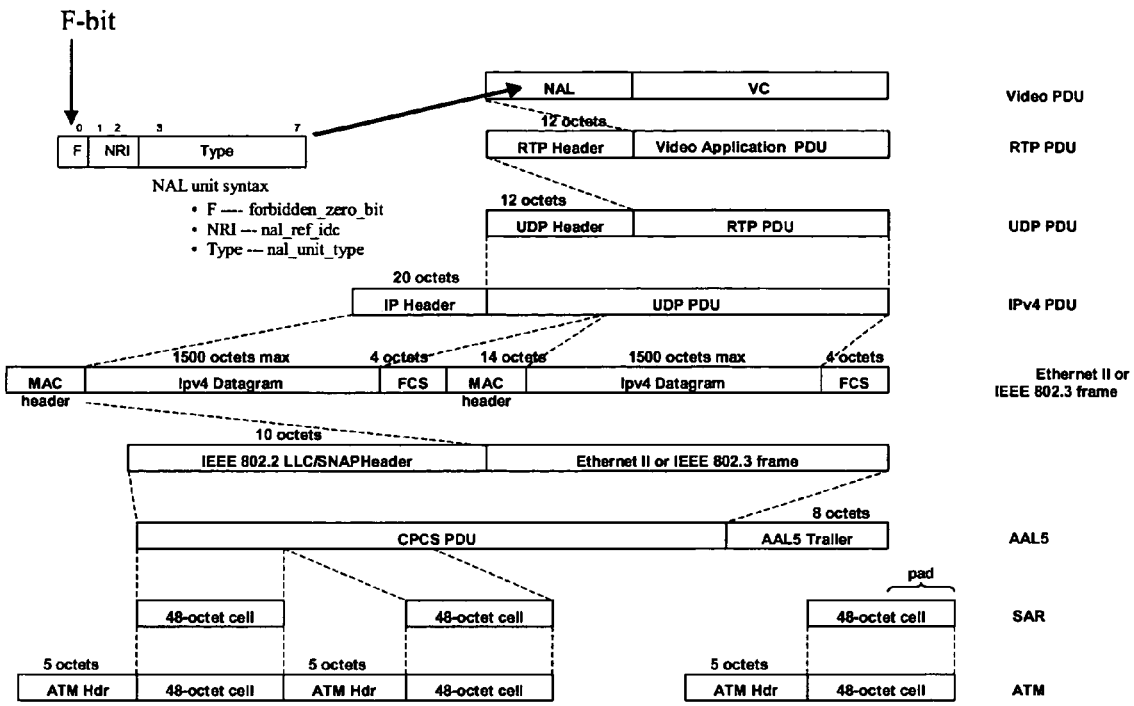
FIG. 6 illustrates a specific example of how the present invention could be adapted to a video network service based on IP transport and H.264 video compression.

FIG. 3 illustrates a greatly simplified view of a packet of the type that would be used to convey video or audio data. The packet 40 includes a header, which includes information on addressing, status, and priority indicators and a payload, which includes the audio and video data. In most video protocols, such as MPEG (Motion Picture Experts Group), MPEG2 and MPEG4, among others, the payload often carries differential information (i.e., the information describing how a frame varies from a previously transmitted frame) and, hence, the payload may vary in size dramatically from packet to packet in a stream. A more detailed illustration is shown in FIG. 6.

FIG. 4a illustrates a simplified view of an intermediary network element 14. The intermediary network element 14 includes a FIFO memory 50, an input from receiving packets, an output 54 for forwarding packets, and control circuitry 56 for controlling the FIFO 50. Packets A-E are shown in the FIFO memory 50, along with free space.

As described above, packets may be received faster than they can be sent, which will cause a FIFO overrun. One reason for an overrun may be the limited bandwidth of the DSL connection between the DSLAM element 30 and the DSL modem element 32. As more channels are being requested at the user premises, the number of packets multiplexed at the DSLAM element 30 for that user premises increases. In general, a commercial IP television system will be designed such that the bandwidth will support a certain number of data streams for the premises; however, if multiple channels are sending large information packets simultaneously, congestion may occur which will require discarding some packets in the data stream.

In the preferred embodiment, the discarding intermediary network element 14 can determine the relative importance of different packets in the FIFO. For example in a video data stream, packets, representing compressed video frames are marked with priority indicators that allow the traffic management function to distinguish between low and high priority packets. Preferably, low priority packets are discarded first (i.e., before resorting to discarding higher priority packets) to preserve the highest quality video experience to the end user. A selective packet discarding function in control circuitry 56 looks into the application layer header of a packet to determine whether the packet is a candidate for being discarded.

Typically, discarded packets remain within the FIFO memory 50 until they reach the output stage 54. The control circuitry 56 maintains a list of discarded packets in the FIFO memory 50. Normally, when a discarded packet arrives at the output of the FIFO memory 50, the packet is discarded from the FIFO memory 50 without further transmission. Because the speed of transmitting the packet on the network is much slower than the speed of dumping the packet from the FIFO memory, marking packets as discarded can quickly free space in the FIFO memory 50.

In an actual embodiment, it may be useful to store the header information in a FIFO separate from the much larger payloads. The control circuitry would operate on the header information as packets progressed through the queue, and then the payloads would be attached (if the packet was not marked as discarded) by the output circuitry 54.

As previously described, in the prior art, the destination device 12 cannot differentiate between a delayed packet and a discarded packet. Existing equipment is forced to wait for a minimum amount of time, equal to the packet arrival delay variation plus a guard time, before reacting to the loss of information condition. At the end of this time period, the destination device 12 will take steps to conceal the loss of the information.

In the present invention, however, when an information packet is lost from an application data flow due to a controlled discard within a statistical multiplexing function, the discarding device will only discard the payload of the packet and, when the packet reaches the front of the FIFO memory 50, a small notification packet (including, for example, the original packet's updated header with a "payload discarded" indicator) will be sent to inform the destination device 12 of the lost information. By keeping the notification packet small, the transmission of the message packet will have only a minimal impact on the congestion problems in the discarding device. However, the destination device 12, upon receiving the message packet and learning that a particular packet information (data content) will not be arriving, can make better and faster decisions on concealing the error caused by that lack of information. Using this new solution, the application can react to controlled packet loss as soon as the informative substitute packet arrives. In a video context, the destination device 12 can initiate error processing functions, such as video artifact concealment, immediately upon learning of the missing information, thus enhancing the quality of the video experience to the end user.

Figure 4B:
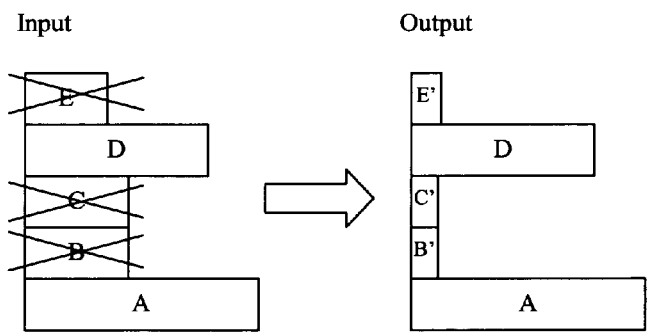
FIG. 4b illustrates the replacement of a discarded packets with a smaller notification packet.

FIG. 4b illustrates the replacement of discarded packets with smaller notification packets. At the input 52, intermediary network element 14 receives five packets A-F, and detects a congestion situation. Packets B, C and E are considered lower priority packets and are marked for discard. At the output, much smaller notification packets B', C' and D' are transmitted towards the destination device 12.

Figure 5:
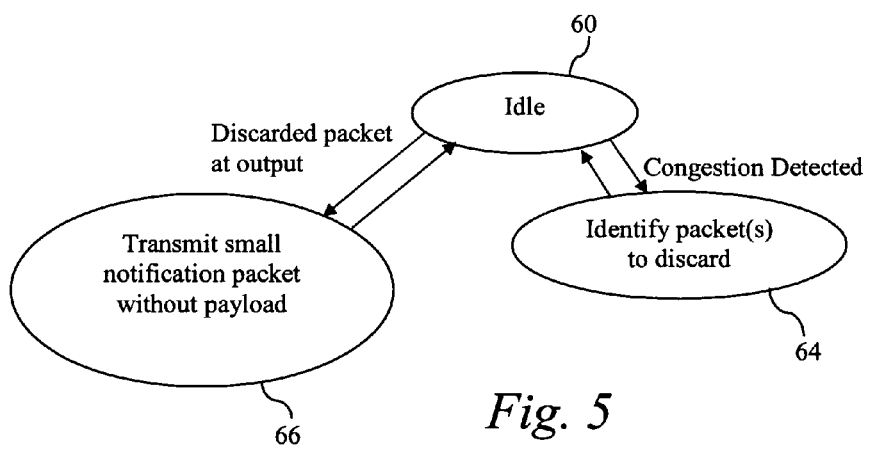
FIG. 5 shows the operation of the control circuitry with regard to a discarded packet.

FIG. 5 shows the operation of the control circuitry 56 with regard to a discarded packet. From idle state 60, if actual or expected congestion is detected, one or more candidate packets for discard are identified in state 62 (and control returns back to state 60). When an identified packet reaches the output of the FIFO memory 50, a small notification packet is sent to the destination device 12 in state 64 (and control returns back to state 60).

While the preferred embodiment is shown in connection with a FIFO memory, it should be noted that a non-FIFO addressable architecture could be used as well to queue the packets as well.

FIG. 6 illustrates how the present invention could be adapted to a video network service based on IP transport and H.264 video compression; it being understood that the invention is not limited to this particular standard, but could be used with almost any standard in a variety of different applications. FIG. 6 shows a packet structure for access services provided by a DSLAM element. The header format for this application is defined by the NAL (Network Adaptation Layer). Per current standards, the "F-bit" in the NAL header must be set to "0", but could be set to a "1" if there is a possible problem with the payload. The present invention could use this bit to specify whether the payload has been discarded. To do so, the discarding network element would set the F-bit of a discarded packet to a "1" and clear out the payload before transmitting the packet. This will maintain all of the sequence and header information, and save the resources that were being overloaded and caused the congestion.

Upon reception, if the application at the destination device 12 detects that the F-bit is "0", the receiver processes the packet as normal. If the F-bit is "1" and the payload is empty, the application initiates error concealment procedures or other error handling functions.

An alternative solution for marking packets with discarded payloads, using the packet structure of FIG. 6, instead of setting the F-bit to "0", would be to set the byte following the NAL to null (zero) indicating that the application payload has been removed. In this case the video source (encoder/server) would guarantee that the byte following the NAL would always be non-zero when the packet was transmitted toward the network. The receiver, detecting a null in the first byte following the NAL, would be informed of the removed payload.

There are various ways that the invention could be implemented using existing or future packet structures, and the examples given above merely illustrate the manner in which the invention could be implemented transparently to network elements that do not support the invention.

The action taken by the receiving device upon notification of a discarded packet will vary depending upon the type of information carried by the packet. In an on-demand audio or video situation, there may be time to request retransmission, depending upon the amount of video data being buffered by the receiving device. In a live audio or video application where retransmission is not always possible, however, the receiving device may vary its action by determining whether the lost packet is a high priority packet or a low priority packet. Priority information may be explicitly denoted in the packet header, or determinable from the protocol used to stream the information.

Figure 7:
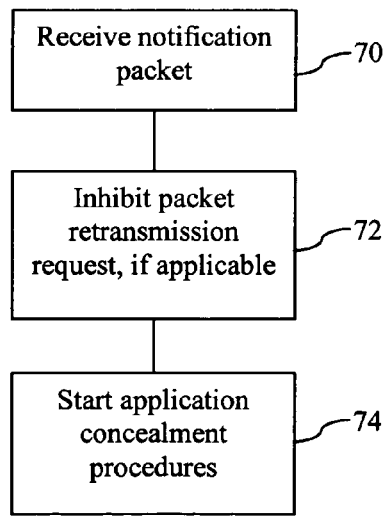
FIG. 7 illustrates operations at the destination device responsive to receiving a notification packet indicating a discarded packet.

FIG. 7 illustrates actions at the destination device 12 (IP receiver 22 in FIG. 2). In step 70, the destination device receives a notification packet, indicating that a packet in the stream has been discarded. If applicable, a packet retransmission request for this packet is inhibited in step 72, and application concealment procedures are started in step 74. This prevents additional congestion due to retransmission requests during periods when congestion is already a problem.

The present invention provides significant advantages over the prior art. The relative bandwidth savings in sending just the header is dependent on the size of the payload that was removed. Normally, in a video application, the size of the header will be just a small fraction of the size of the payload and, therefore, the savings in bandwidth for the discarding device are significant. The increase in the quality of the video will be apparent when early error concealment is used instead of an obvious glitch (objectionable video artifact) caused by a missing packet.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A network comprising:
a source device for sending information;
a destination user device for receiving the information from the source device; and
one or more intermediate network elements for passing the information between the source device and the destination user device,
wherein each of the intermediate network elements include circuitry for:
identifying at least one packet, having a header and a payload, within the information for discard based on a payload a video packet priority indicator within the header;
modifying the header of the at least one identified packet to include a discard indicator, and modifying the at least one identified packet to remove the payload, thereby forming at least one modified packet; and
sending the at least one modified packet to the destination user device.

2. The network of claim 1 wherein the destination user device includes circuitry for correcting errors in response to receiving the at least one modified packet.

3. The network of claim 2 wherein the circuitry for correcting errors includes circuitry for selectively inhibiting retransmission requests and for concealing errors due to missing information.

4. The network of claim 1 wherein the payload contains video information.

5. The network of claim 1 wherein the payload contains audio information.

6. The network of claim 1, wherein the information comprises real-time, multicasted information.

7. A network element for passing information between a source device and a destination user device, comprising:
circuitry for identifying at least one packet, having a header and a payload, within information for discard based on a video packet priority indicator within the header;
circuitry for modifying the header of the at least one identified packet to include a discard indicator, and modifying the at least one identified packet to remove the payload, thereby forming at least one modified packet; and
circuitry for sending the at least one modified packet to a destination user device.

8. The network element of claim 7 wherein the payload contains video information.

9. The network element of claim 7 wherein the payload contains audio information.

10. The network element of claim 7 and further comprising memory for storing received packets.

11. The network element of claim 10 wherein said memory comprises a FIFO memory.

12. The network element of claim 10 wherein said memory comprises a randomly addressable memory.

13. The network element of claim 7, wherein the information comprises real-time, multicasted information.

14. A method of passing information between a source device and a destination user device, comprising the steps of:
receiving packets within information in a network element, the packets being sent from the source device toward the destination user device;
identifying at least one packet, having a header and a payload, within the information for discard based on a video packet priority indicator within the header;
modifying the header of the at least one identified packet to include a discard indicator, and modifying the at least one identified packet to remove the payload, thereby forming at least one modified packet; and
sending the at least one modified packet to the destination user device.

15. The method of claim 14 and further comprising the steps of inhibiting a retransmission request at the destination user device responsive to receiving the at least one modified packet and performing concealment procedures at the destination device.

16. The method of claim 14, wherein the information comprises real-time, multicasted information.

* * * * *